March 27, 1928.
W. D. HAMERSTADT
1,664,361
PROCESS OF MAKING SPLIT PULLEYS
Filed Nov. 24, 1925
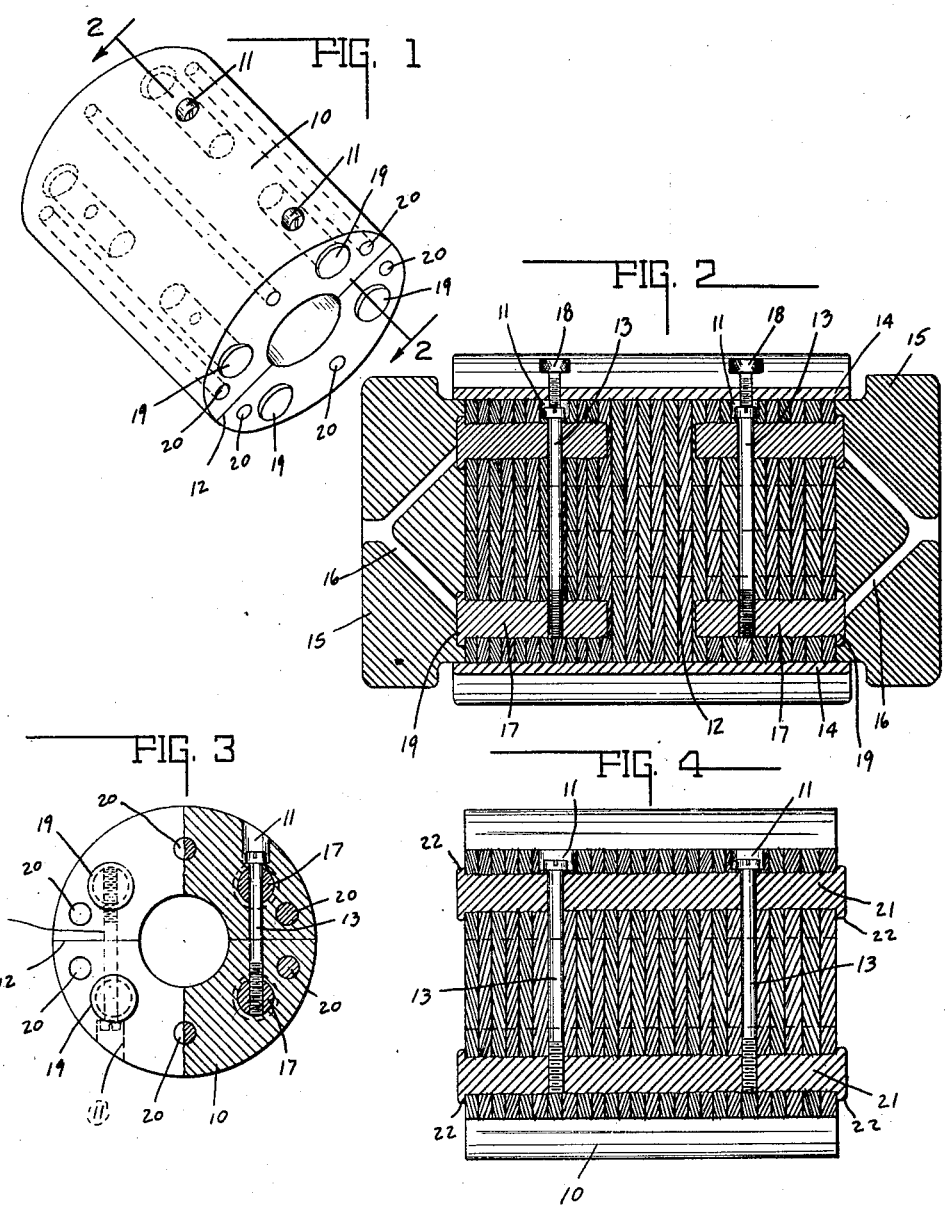
INVENTOR.
WILLIAM D. HAMERSTADT.
BY
ATTORNEYS.

Patented Mar. 27, 1928.

1,664,361

UNITED STATES PATENT OFFICE.

WILLIAM D. HAMERSTADT, OF INDIANAPOLIS, INDIANA, ASSIGNOR TO ROCKWOOD MANUFACTURING COMPANY, OF INDIANAPOLIS, INDIANA, A CORPORATION.

PROCESS OF MAKING SPLIT PULLEYS.

Application filed November 24, 1925. Serial No. 71,181.

This invention relates to a split fibrous pulley structure and the process of making the same. The object of the invention is to provide a split fibrous pulley which may be detachably secured about a shaft in the usual manner, the pulley of this character being usually formed from paper laminations compressed together so that the fibre paper body will be of great density and be of a substantially solid character for providing a surface having a high coefficient of friction.

The principal feature of the invention resides in the manner of providing anchoring lugs in each of the split sections, the corresponding lugs in each section being detachably connected by a suitable screw bolt extending therein.

Another feature of the invention, and probably the most important, resides in the manner of forming the lugs in recesses previously formed in the laminated sections of the pulley by die-casting metal therein under such pressure as to effect a bonding with the fibrous surface, or conform to such irregularities of surface as may be created either by the laminations or the formation of the metal receiving recess. The lugs or anchors are cast about the screw bolt or connecting rod which is previously inserted in place, so that the internal screw threads of the lugs or anchors are formed therein during the casting process.

The full nature of the invention will be understood from the accompanying drawings and the following description and claims.

Fig. 1 is a perspective view of the split pulley. Fig. 2 is a section taken on the line 2—2 of Fig. 1. Fig. 3 is a front elevation showing one-half of the pulley cut away in sections. Fig. 4 is a modified form showing a central vertical section illustrating the use of bars extending completely through the pulley structure instead of lugs as shown in Fig. 2.

In the drawings there is shown a pulley structure 10 formed of a plurality of paper or fibrous discs associated together and compressed under high pressure in the usual manner of making paper pulleys or the like. The paper laminations forming the pulley 10 as shown in Fig. 1, are cut diametrically and provided with suitable recesses in each end for receiving the metal forming the lugs as illustrated in Fig. 2. The bores 11 are then drilled through the upper surface at right angles to the split 12 and substantially equi-distant from the ends as well as from the central vertical line extending at right angles to the split surface 12.

The screw threaded locking bolts 13 are mounted in place so as to extend through the reduced portion of the bores 11 from one of the split sections to the other. The pulley structure is then placed in a cylindrical sleeve 14 having its end extending beyond the end of the pulley, said outwardly extending ends of said sleeve being engaged over the die-casting blocks 15 which may be moved into place so as to engage the opposite ends of the pulley structure. The die-casting blocks 15 are thereupon forced toward each other so as to compress the paper laminations and hold them in position under high pressure such as to materially increase their density as illustrated in Fig. 2.

A suitable die-casting metal is then forced through the branch passage-ways 16 in the die-casting blocks so as to force the metal into the lug forming recesses to form the lugs 17. Inasmuch as the connecting bolts 13 extend diametrically through said passages, and the lower ends thereof are screw threaded, the metal forming the lug 17 will form about said bolts, and the threads thereof will cast complementary threads in the metal of the lugs. This eliminates the necessity of boring or tapping the lugs, the bolts 13 being capable of being readily unscrewed therefrom after the structure is completed. If necessary, set screws 18 may be employed to screw through the sleeve 14 and bear against the heads of the bolts 13 for holding them firmly in position to prevent any leakage of the metal through the bores 11.

The metal forced into the lug forming recesses will engage the fibrous surface thereof so as to penetrate into the bores and form a bond therewith, or said metal will conform to any irregularities of the surface. Such irregularities may occur from the drilling of the recesses, or from soft spots in the fibre being compressed by the metal, or by reason of slight separations between the laminations of the paper discs, as set forth and described in Patent No. 1,535,134. Thus the lug 17 will be firmly bound and secured in the fibrous body of the pulley so as to substantially form an integral part thereof. Provision may or may not be made as desired, for forming in connection with the lugs, the heads 19, depending upon the shape of the die head 50.

For securing the laminations together and holding them in their compressed position, a plurality of rods or dowel pins 20 may be employed by inserting them through the laminations before the die casting process, as has heretofore been the practice, or the body of the structure may be provided with a plurality of holes extending longitudinally thereof near the peripheral surface for receiving the die-cast metal forced therein under high pressure through the die blocks 15 at the same time that the lugs 17 are cast thereby. Thus the same bonding effect may be had with respect to the securing of the laminations together as above described with respect to the lug 17 as set forth in the above mentioned Letters Patent.

As shown in the modified form illustrated in Fig. 4, a plurality of bars 21 may be die-cast in the structure in the same manner as above set forth with respect to the lug 17, said bars extending completely through the laminations from one end of the pulley structure to the other, the same being connected by the bolts 13 cast therein. The bars 21 may or may not serve as the binding element, as may be desired, and an end plate or head 22 may be cast integral therewith and formed at each end of the structure.

The invention claimed is:

1. The process of forming a split pulley, comprising two sections consisting in providing a bore in each of said sections extending longitudinally thereof, mounting tie members transversely of said bores so as to extend therein and from one of said sections to the other, and casting metal into said bores as a mold, whereby the metal during the casting operation will engage the tie members and secure them in place for connecting the pulley sections together.

2. The process of forming a split pulley comprising two sections consisting in providing a pair of bores in each of said sections adjacent their split surfaces, mounting tie bolts transversely of said bores so as to extend from one section to the other, and casting metal into said bores as a mold for forming the anchor members for said tie bolts, whereby the metal during the casting operation will surround and detachably secure the tie members in place so as to permit of the removal or insertion thereof for detachably connecting the pulley sections together.

3. The process of forming a split pulley comprising two sections formed of a plurality of fibrous laminations, consisting in providing each of said sections with a plurality of bores adjacent their abutting split surfaces and extending longitudinally thereof, mounting screw threaded tie bolts therein so as to extend transversely of said bores from one section to the other, and die casting metal into said bores as a mold under sufficient pressure to engage in any irregularities formed in the surface of said bores for securing the laminations together, the screw threads of said bolts being cast therein so as to permit the removal thereof and the disengagement of said sections, substantially as and for the purpose described.

In witness whereof, I have hereunto affixed my signature.

WILLIAM D. HAMERSTADT.